United States Patent
Marr et al.

(10) Patent No.: US 6,671,795 B1
(45) Date of Patent: Dec. 30, 2003

(54) METHOD AND APPARATUS FOR PAUSING EXECUTION IN A PROCESSOR OR THE LIKE

(75) Inventors: Deborah T. Marr, Portland, OR (US); Dion Rodgers, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/489,130

(22) Filed: Jan. 21, 2000

(51) Int. Cl.$^7$ ................................................ G06F 9/48
(52) U.S. Cl. ....................... 712/220; 712/228; 712/244; 709/107
(58) Field of Search ................................ 709/108, 107, 709/106, 102; 712/231, 220, 225, 226, 228, 229, 230, 245, 300, 244

(56) References Cited

U.S. PATENT DOCUMENTS

| | | | | |
|---|---|---|---|---|
| 5,355,457 A | * | 10/1994 | Shebanow et al. | 712/218 |
| 5,524,247 A | * | 6/1996 | Mizuno | 710/200 |
| 5,546,593 A | * | 8/1996 | Kimura et al. | 712/228 |
| 5,584,031 A | | 12/1996 | Burch et al. | 395/750 |
| 5,632,032 A | * | 5/1997 | Ault et al. | 709/100 |
| 5,784,616 A | * | 7/1998 | Horvitz | 709/102 |
| 5,872,963 A | * | 2/1999 | Bitar et al. | 712/233 |
| 5,961,584 A | * | 10/1999 | Wolf | 709/103 |
| 5,961,639 A | | 10/1999 | Mallick et al. | 712/242 |
| 6,216,220 B1 | * | 4/2001 | Hwang | 712/219 |
| 6,493,741 B1 | * | 12/2002 | Emer et al. | 709/107 |

FOREIGN PATENT DOCUMENTS

| | | |
|---|---|---|
| EP | 0 655 673 | 5/1995 |
| EP | 0 827 071 | 3/1998 |

OTHER PUBLICATIONS

Patent Abstracts of Japan, vol. 008, No. 233, Oct. 26, 1984 & JP 59 111526 A (Fujitsu KK), Jun. 27, 1984.

* cited by examiner

Primary Examiner—Henry W. H. Tsai
(74) Attorney, Agent, or Firm—Kenyon & Kenyon

(57) ABSTRACT

A method and apparatus for pausing execution of instructions from a thread is described. In one embodiment, a pause instruction is implemented as two instructions or microinstructions: a SET instruction and a READ instruction. When a SET flag is retrieved for a given thread, the SET instruction sets a Bit flag in memory indicating that execution for the thread has been paused. The SET instruction is placed in the pipeline for execution. The following READ instruction for that thread, however, is prevented from entering the pipeline until, the SET instruction is executed and retired (resulting in a clearing of the Bit flag). Once the Bit flag has been cleared, the READ instruction is placed in the pipeline for execution. During the time that processing of one thread is paused, the execution of other threads may continue.

33 Claims, 4 Drawing Sheets

METHOD AND APPARATUS FOR PAUSING EXECUTION IN A PROCESSOR OR THE LIKE

FIELD OF THE INVENTION

The present invention pertains to a method and apparatus for pausing execution in a processor or the like. More particularly, an embodiment of the present invention pertains to controlling the pausing of execution of one of a plurality of threads so as to give preference to another of the threads or to save power.

BACKGROUND OF THE INVENTION

As is known in the art, a processor includes a variety of sub-modules, each adapted to carry out specific tasks. In one known processor, these sub-modules include the following: an instruction cache, an instruction fetch unit for fetching appropriate instructions from the instruction cache; decode logic that decodes the instruction into a final or intermediate format, microoperation logic that converts intermediate instructions into a final format for execution; and an execution unit that executes final format instructions (either from the decode logic in some examples or from the microoperation logic in others).

Under operation of a clock, the execution unit of the processor system executes successive instructions that are presented to it. As is known in the art, an instruction may be provided to the execution unit which results in no significant task performance for the processor system. For example, in the Intel® X86 processor systems, a NOP (No Operation) instruction causes the execution unit to take no action for an "instruction cycle." An instruction cycle as used herein is a set number of processor clock cycles that are needed for the processor to execute an instruction. In effect, the NOP instruction stalls the processor for one instruction cycle.

A limitation of the NOP instruction is that it stalls the processor for a set unit of time. Thus, using one or more NOP instructions, the processor can only be stalled for an amount of time equal to a whole number multiple of instruction cycles.

Another limitation of the NOP instruction is that the execution unit of the processor is unable to perform any other instruction execution. For example, instructions to be executed by the execution unit may be divided into two or more "threads." Each thread is a set of instructions to achieve a given task. Thus, if one of the threads includes a NOP instruction, this instruction is executed by the execution unit and stalls the entire processor (i.e., execution of the other thread cannot be done during the execution of the NOP instruction).

In view of the above, there is a need for an improved method and apparatus for pausing processor execution that avoids these limitations.

SUMMARY OF THE INVENTION

According to an embodiment of the present invention, a method of pausing execution of instructions in a thread is presented. First it is determined if a next instruction for a first thread is an instruction of a first type. If it is then instruction of the first thread are prevented from being processed for execution while instruction from a second thread can be processed for execution.

BRIEF DESCRIPTIONS OF THE DRAWINGS

DETAILED DESCRIPTION

Figure 1:
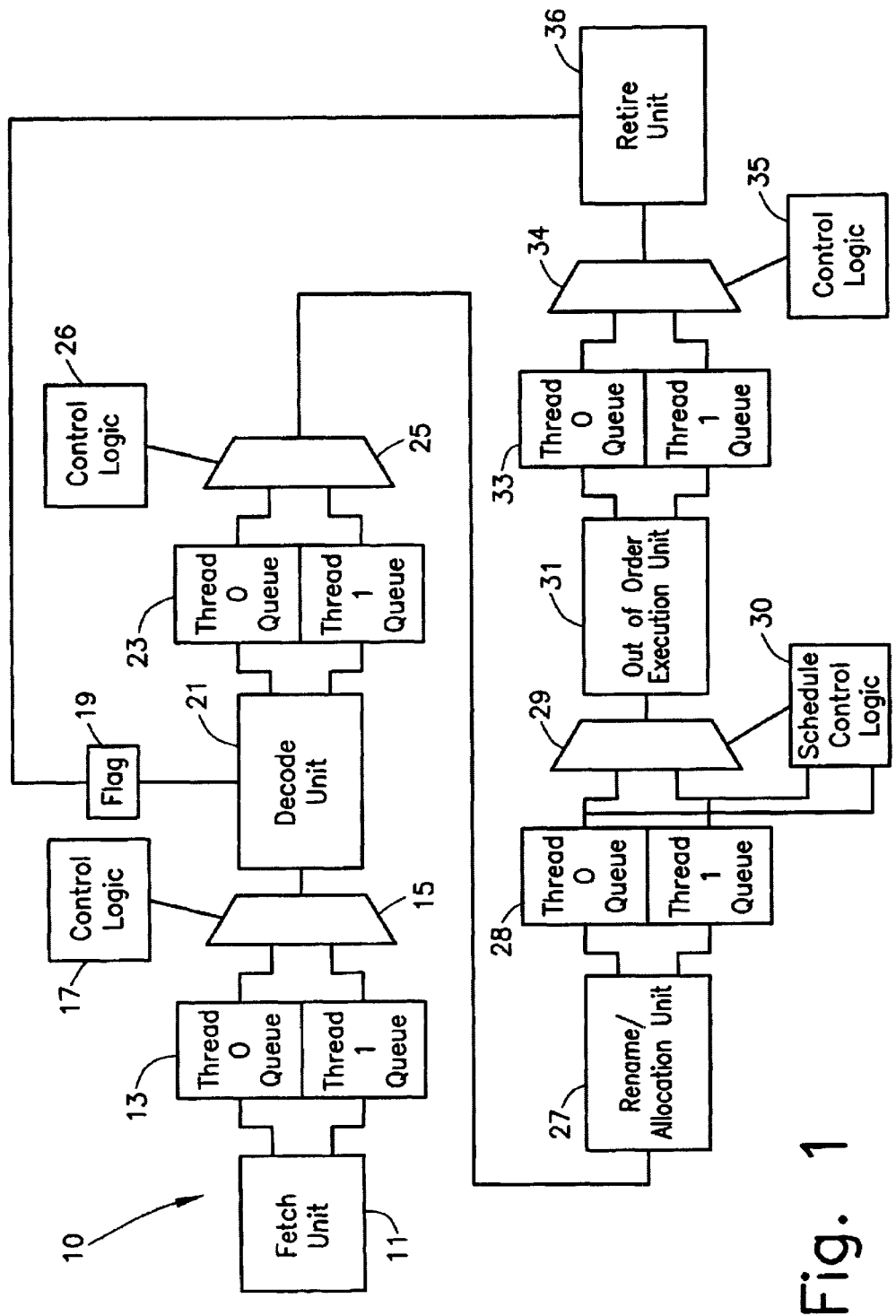
FIG. 1 is a block diagram of a portion of a processor employing an embodiment of the present invention.

A Referring to FIG. 1, an example of a portion of a processor system 10 employing an embodiment of the present invention is shown. In this embodiment, the processor is a multi-threaded processor where the execution is theoretically divided into two or more logical processors. As used herein, the term "thread" refers to an instruction code sequence. For example, in a video phone application, the processor may be called upon to execute code to handle video image data as well as audio data. There may be separate code sequences whose execution is designed to handle each of these data types. Thus, a first thread may include instructions for video image data processing and a second thread may be instructions for audio data processing. In this example, there is a single execution unit (out of order execution unit 31), which may execute one instruction at a time. The processor system 10, however, may be treated as two logical processors, a first logical processor executing instructions from the first thread (Thread 0) and a second logical processor executing instructions from the second thread (Thread 1).

In this embodiment of the processor system 10, instructions are fetched by a fetch unit 11 and supplied to a queue 13 and stored as part of the thread 0 queue or the thread 1 queue. One skilled in the art will appreciate that the queues used in processor system 10 may be used to store more than two threads. Instructions from the two threads are supplied to a mulitplexer (MUX) 15, and control logic 17 is used to control whether instructions from thread 0 or thread 1 are supplied to a decode unit 21. Decode unit 21 may convert an instruction into two or more microinstructions and supplies the instructions to queue 23. The outputs of queue 23 are supplied to a MUX which supplies instruction from thread 0 or thread 1 to a rename/allocation unit 27 based on operation of control logic 26. The rename/allocation unit 27, in turn, supplies instructions to queue 28. MUX 29 selects between the thread 0 queue and the thread 1 queue based on the operation of schedule control logic 30, which also receives the same inputs as MUX 29. The output of MUX 29 is supplied to an execution unit 31 which executes the instruction. The instruction is then placed in queue 33. The outputs of queue 33 are supplied to a MUX 34 which sends instruction from thread 0 and thread 1 to a retire unit 36 based on the operation of control logic 35.

According to a first embodiment of the present invention, a pause instruction is used to suspend processing of instructions from a thread. In FIG. 1, the pause instruction is fetched by fetch unit 11 and stored in the thread 0 queue, in this example. The output of the thread 0 queue is supplied via MUX 15 to decode unit 21 which decodes the pause instruction into two microinstructions: a SET instruction and a READ instruction. At the decode unit 21, a SET instruction causes a value to be stored in memory (e.g., a bit flag 19) indicating that a SET instruction has been received for a particular thread (thread 0 in this example). The SET instruction is then fed into the "pipeline" which includes rename/ allocation unit 27 and execution unit 31 and the associated queues in this embodiment. Execution unit 31 takes no action on the SET instruction (i.e., treats it as the known NOP instruction). Once the SET instruction is retired by retire unit 26, the flag 19 is reset.

The READ instruction at decode unit 21 is not placed into the pipeline until the flag 19 is reset. Accordingly, if there are instructions from thread 1 in queue 13, these instructions can be decoded by decode unit 21 and placed into the pipeline. Thus, depending on the number of thread 1 instructions in queues 23, 28 and 33, will affect how long the execution of thread 0 is paused (i.e., the greater number of thread 1 instructions in the pipeline, the longer it will take the SET instruction to reach retire unit 36). Once the flag 19 is reset, the READ instruction is sent to queue 23 and is eventually sent to execution unit 31. As with the SET instruction, execution unit takes no action as with a NOP instruction. In this embodiment of the present invention, decode unit 21 alternates decoding of instructions from thread 0 and thread 1. After a SET instruction for thread 0, for example, the decode alternates between decoding instructions from thread 1 and checking the value of flag 19 until it is reset.

Figure 2:
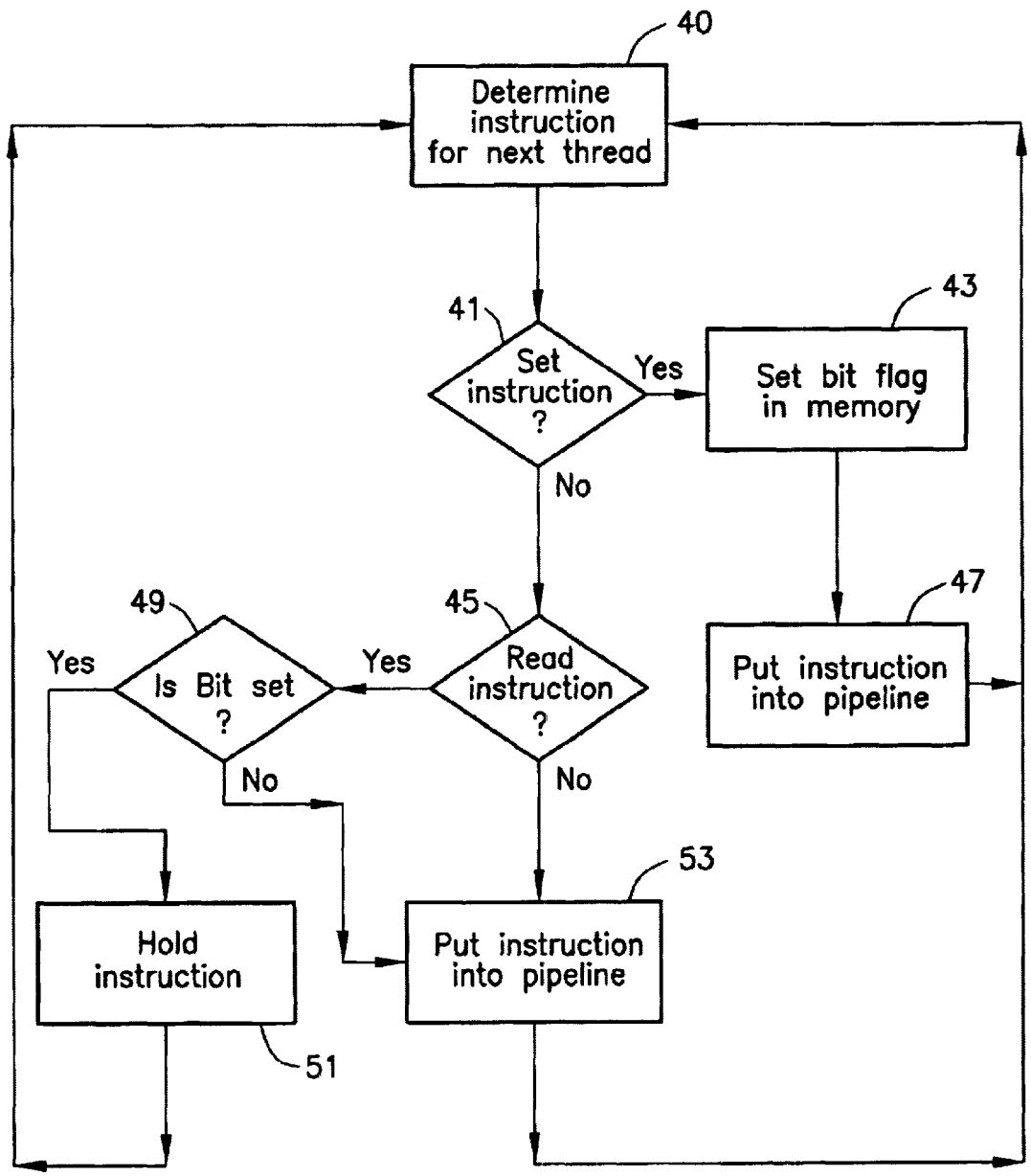
FIG. 2 is a flow diagram showing an embodiment of a method according to an embodiment of the present invention.

An example of the operation of decode unit 21 in this embodiment is shown in FIG. 2. After decoding, in block 40, the instruction from the next thread is determined. In decision block 41, it is determined whether the instruction is a SET instruction. If it is, then control passes to block 43 where the bit flag in memory is set. In block 47, the SET instruction is placed into the pipeline for the execution unit. Control then returns to block 40 to determine the next instruction from the next thread. If the instruction is not a SET instruction, control passes to decision block 45 to determine if the instruction is a READ instruction. If it is, then control passes to decision block 49 to determine if the appropriate bit flag in memory is set. If the bit flag in memory is set, then control passes to block 51 where the instruction is held back from the pipeline (thus, temporarily blocking execution of instructions from that particular thread). Control then shifts to block 40 to determine the next instruction from the next thread. If the bit flag is not set (decision block 49), then control passes to block 53 where the instruction (in this case the READ instruction) is placed into the pipeline for execution. As stated above, the bit flag is reset in this embodiment when the SET instruction is retired. Control then returns to block 40 to determine the next instruction from the next thread. Likewise, if the instruction is neither a SET instruction nor a READ instruction, it is placed into the pipeline for execution in a normal manner.

As seen from the above, the SET instruction works to effect a pause in execution for that thread until the instruction is retired. This is because the following READ instruction is not placed into the pipeline until the SET instruction is retired effectively blocking execution of the following instructions from that thread. During the pause of one thread, instructions from that thread are prevented from being processed for execution (e.g., placed into the pipeline, sent to the execution unit, etc.) while instructions from another thread can be processed for execution. When execution of a thread is paused, overall power consumption for the processing system may be reduced.

Figure 3:
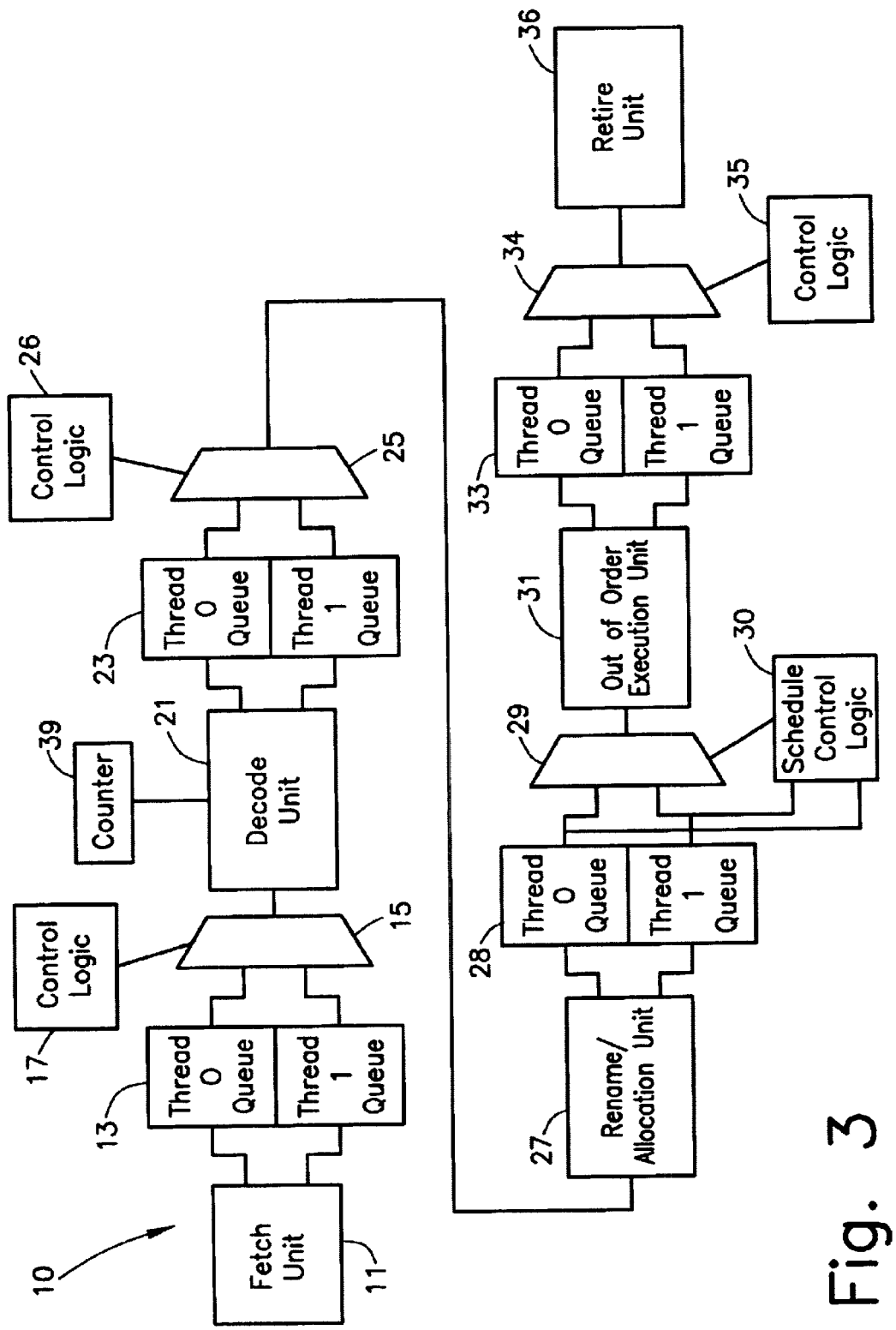
FIG. 3 is a block diagram of a portion of a processor employing an additional embodiment of the present invention.

According to another embodiment of the present invention, a pause instruction is implemented with a timer or counter. As shown in FIG. 3, the memory flag 19 of FIG. 1 is replaced by a counter 39. As a first example, when decode unit 21 determines that the next instruction from a first thread is a pause instruction (i.e., an instruction having a particular bit format), then a predetermined value is loaded into counter 39. In this example, counter 39 counts down from the predetermined value to zero. While counter 39 counts down to zero, instructions from the second thread (e.g., thread 1) are decoded and loaded into the pipeline. In this example, decode unit 21 alternates between checking the value of counter 39 (instead of decoding instructions from thread 0) and decoding instructions from thread 1. Once the counter has finished (e.g., reached zero), the next instruction from that thread can be loaded into the pipeline. As a second example, the pause instruction will include an operand (i.e., a value to be loaded into the timer). Accordingly, this allows decode unit 21 to load the operand value into counter 39 so that the length of time for the pause instruction can be set.

Figure 4:
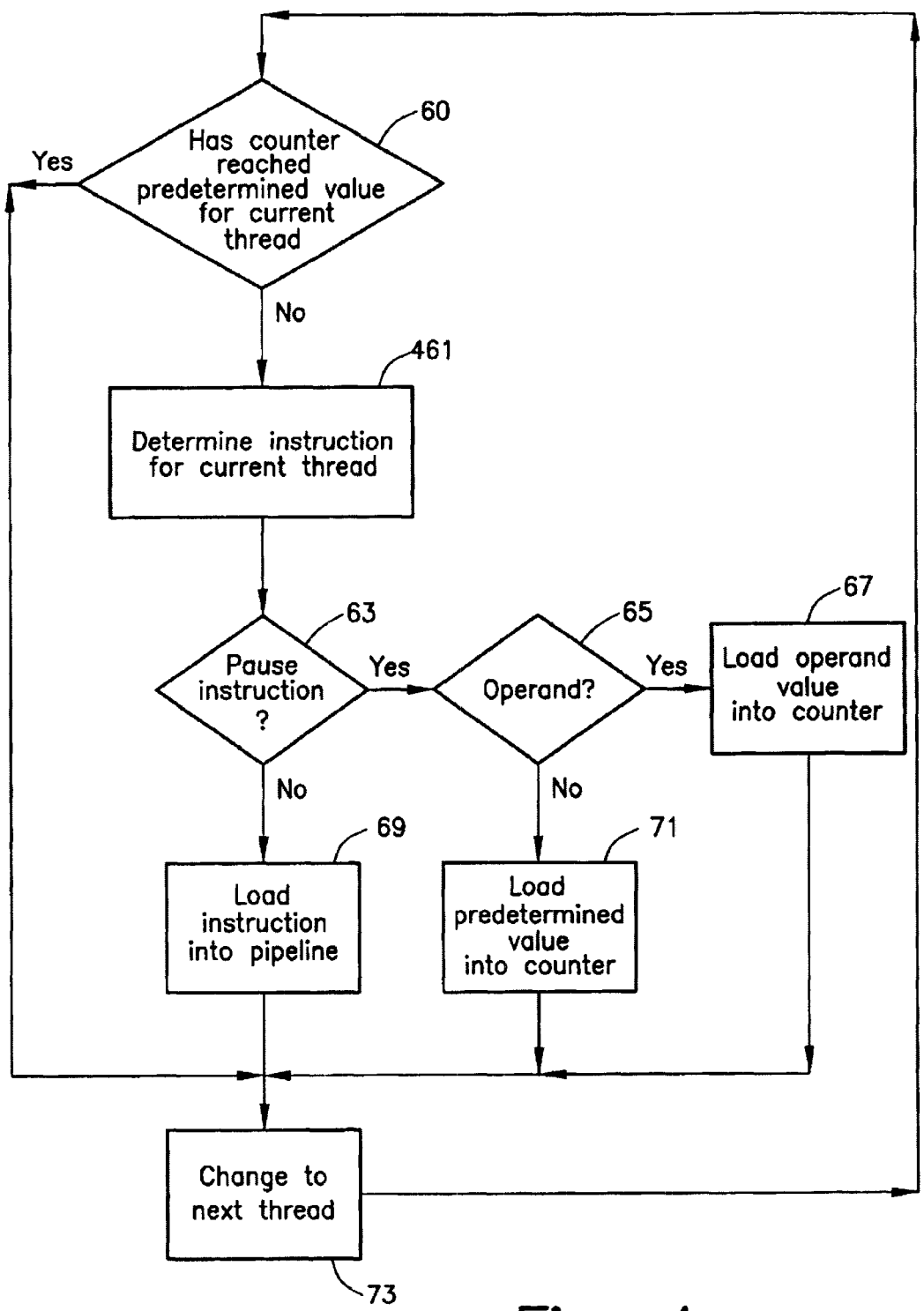
FIG. 4 is a flow diagram showing an additional embodiment of a method according to an embodiment of the present invention.

An example of the operation of the processing system of FIG. 3 is shown in FIG. 4. In decision block 60 it is determined if the counter has reached a predetermined value for the current thread. If no counter has been set or if the value has reached the predetermined value (e.g., zero), then control passes to block 61 to determine the next instruction for the current thread. If this instruction is a pause instruction (decision block 63), then control passes to decision block 65 to determine whether an operand is associated with the pause instruction. If an operand is associated with the pause instruction, then control passes to block 67 to load the value into the counter (control then passes to block 73 to change to the next thread). If an operand is not associated with the pause instruction, then control passes to block 71 to load a predetermined value into the counter (again control then passes to block 73 to change to the next thread). If in decision block 63, the instruction is not a pause instruction, then control passes to block 69 to load the instruction into the pipeline.

According to an embodiment of the present invention, the use of the pause instruction can be an indication by the operating system that the processing system hardware can go into a low-power mode. Thus, execution of operating system code (or any other software code) at the processor system may cause a pause instruction to be forward to the decode unit. As described above, pausing execution of a thread may lead to a decrease in overall power consumption. In response to decoding a pause instruction, the processing system 10 may take other steps to lower overall power consumption further as desired.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method of pausing execution of instructions in a thread, comprising:

determining if a first instruction for a first thread is an instruction of a first type;

preventing instructions of said first thread from being processed for execution for a period of time if said first instruction is decoded to be of a first type while instructions from a second thread can be processed for execution; and resuming execution of said first thread responsive to retirement of said first instruction.

2. The method of claim 1 further comprising decoding said first instruction into a first microinstruction and a second microinstruction.

3. The method of claim 2 wherein said first microinstruction causes a value to be stored in memory for said first thread.

4. The method of claim 3 further comprising:
processing said second microinstruction for execution when said value stored in memory is reset.

5. The method of claim 4 wherein said value stored in memory is reset when said first microinstruction is retired.

6. A method comprising:
determining if a first instruction for a first thread is an instruction of a first type;
initiating a counter upon decoding said instruction of said first type; and
preventing instructions of said first thread from being processed for execution until said counter reaches a predetermined value while instructions for a second thread are processed for execution.

7. The method of claim 6 wherein said first instruction includes an operand and said initiating includes loading said counter with said operand.

8. The method of claim 6 further comprising resuming processing for execution instructions of said first thread after said counter reaches said predetermined value.

9. A method comprising:
receiving a pause instruction from a first thread at a decode unit in a processor system;
preventing instructions of said first thread from being processed for execution for a period of time while instructions from a second thread can be processed for execution; and
resuming processing of said first thread for execution in response to retirement of said pause instruction.

10. The method of claim 9 wherein execution of software code causes said pause instruction to be received at said decode unit.

11. An apparatus pausing execution of instructions in a thread, comprising:
a decode unit to determine if a first instruction for a first thread is an instruction of a first type, said decode unit to prevent instructions of said first thread from being processed for execution for a period of time while instructions from a second thread can be processed for execution, said decode unit further to cause resumption of processing instructions of said first thread in response to retirement of said first instruction.

12. The apparatus of claim 11 wherein said first instruction comprises of a first microinstruction and a second microinstruction.

13. The apparatus of claim 12 further comprising:
a memory, wherein said first microinstruction causes a value to be stored in memory for said first thread.

14. The apparatus of claim 13 wherein said decode unit processes said second microinstruction for execution when said value stored in memory is reset.

15. The apparatus of claim 14 further comprising:
a retire unit coupled to said decode unit wherein said retire unit causes said value stored in memory to be reset when said first microinstruction is retired by said retire unit.

16. An apparatus comprising:
a decode unit to determine if a first instruction for a first thread is an instruction of a first type;
a counter coupled to said decode unit, said counter to be initiated if said first instruction for said first thread is decoded to be an instruction of said first type, said decode unit to prevent instructions of said first thread from being processed for execution until said counter reaches a predetermined value; and
wherein instructions for a second thread can be processed for execution while instructions for execution while instructions of said first thread are prevented from being processed and wherein said decode unit resumes processing instructions of said first thread in response to said first instruction.

17. The apparatus of claim 16 wherein said first instruction includes an operand to be loaded into said counter.

18. The apparatus of claim 16 wherein said decode unit can continue to operate while said first thread is prevented from being processed.

19. An apparatus for reducing power consumption comprising:
a processor including
a decode unit to receive a first instruction from a first thread in said processor system, said decode unit to prevent instructions of said first thread from being processed for execution for a period of time in response to decoding of a first instruction of said first thread while instructions from a second thread can be processed for execution, and said decode unit further to resume allowing instructions of said first thread to be processed for execution in response to retirement of said first instruction.

20. The apparatus of claim 19 wherein execution of software code at said processor causes said first instruction to be received at said decode unit.

21. A processor comprising:
a decode unit to receive a first instruction from a first thread and to cause said processor to suspend processing of instructions from said first thread for a period of time in response to decode of said first instruction, wherein said decode unit is able to process instructions from a second thread during said period, and said decode unit to resume processing instructions from said first thread in response to retirement of said first instruction.

22. The processor of claim 21 wherein said decode unit is to allow instructions from said second thread to execute during said period.

23. The processor of claim 22 wherein said decode unit is to suspend processing of instructions subsequent to said first instruction from said first thread during said period of time.

24. The processor of claim 23 wherein said decode unit is to prevent execution of instructions from said first thread by preventing the dispatch of other instructions from said first thread until said first instruction is retired.

25. The processor claim 21 wherein said period is a predetermined period of time.

26. A method comprising:
receiving instructions for a first thread;
decoding a first instruction from said first thread into a second instruction and a third instruction;
setting a flag to indicate presence of said second instruction;
sending said second instruction into a pipeline;
holding said third instruction from entering said pipeline if said flag is set, wherein said first thread is paused from being processed;
executing said second instruction;
resetting said flag upon retirement of said second instruction; and releasing said third instruction into said pipeline after said flag is reset, wherein processing of said first thread is resumed.

27. The method of claim 26 further comprising:

freeing processing resources to process a second thread while said first thread is paused; and processing instructions of said second thread.

28. A method comprising:

decoding a first instruction from a first thread into a second instruction and a third instruction;

holding said third instruction from entering an instruction pipeline until said second instruction retires;

executing said second instruction; and releasing said third instruction into said instruction pipeline.

29. The method of claim 28 further comprising:

suspending processing of instructions from said first thread subsequent to said first instruction;

processing instructions from a second thread while said first thread is suspended; and resuming processing of instructions from said first thread in response to retirement of said third instruction.

30. The method of claim 29 further comprising:

setting a flag to in response to said second instruction; and resetting said flag in response upon retirement of said second instruction.

31. A method comprising:

loading a counter with a first value in response to decoding of a first instruction of a first thread;

pausing processing of said first thread, wherein instructions subsequent to said first instruction of said first thread are paused from entering a pipeline until said counter counts to a predetermined value;

processing a second thread while said first thread is paused; and resuming processing of said first thread after said counter counts to said predetermined value.

32. The method of 31 wherein said first instruction includes an operand, said operand to be loaded into said counter as said first value.

33. The method of 31 wherein said first value corresponds to a predetermined period of time.

* * * * *